United States Patent [19]
Son et al.

[11] Patent Number: 5,737,080
[45] Date of Patent: Apr. 7, 1998

[54] SOLID STATE NONPLANAR LASER GYROSCOPE

[75] Inventors: Seong-Hyun Son, Seoul; Sang-Keun Gil, Kwangmyung-Shi; Jung-Mi Hong, Seoul; Jae-Cheul Lee, Kwangmyung-Shi, all of Rep. of Korea; Andrey L. Livintsev; Valentin G. Dmitriev, both of Moscow, Russian Federation

[73] Assignee: Institute for Advanced Engineering, Seoul, Rep. of Korea

[21] Appl. No.: 766,739

[22] Filed: Dec. 13, 1996

Related U.S. Application Data

[60] Provisional application No. 60/008,715, Dec. 15, 1995.
[51] Int. Cl.⁶ ................................................. G01C 19/64
[52] U.S. Cl. ................................................. 356/350
[58] Field of Search ................................................. 356/350

[56] References Cited

U.S. PATENT DOCUMENTS 5,367,377  11/1994  Rahn ........................................ 356/350

*Primary Examiner*—Vincent P. McGraw
*Attorney, Agent, or Firm*—Jacobson, Price, Holman & Stern, PLLC

[57] ABSTRACT

A new concept of gyroscope utilizing self-modulation is introduced in a frame of a solid state ring type laser. The inventive solid state ring laser system includes a base, a laser pumping source, an active medium, a focussing unit, a detector, a magnet and a cover, wherein the magnet having an appropriate magnetic field strength to distinguish the direction of rotation and to increase the sensitivity. In the inventive gyroscope, a direct sensing of rotation is made by measuring the self-modulation frequency without complex signal processing by using a frequency counter.

5 Claims, 4 Drawing Sheets

SOLID STATE NONPLANAR LASER GYROSCOPE

This application claims the benefit of U.S. Provisional application Ser. No. 60/008,715 filed Dec. 15, 1995.

The present invention relates to a laser gyroscope; and, more particularly, to a laser gyroscope capable of determining a rotation angle of the laser gyroscope by measuring a self-modulation frequency of one of the counterpropagating waves established in an active medium thereof, wherein each of the counterpropagating waves is self-modulated by an interaction between the counterpropagating waves inside the active medium.

BACKGROUND OF THE INVENTION

It is well known that two counterpropagating laser beams can be established in a ring type laser. When the ring type laser is rotated about the sensitive axis which is perpendicular to the area enclosed by the beam path, the frequency of a beam travelling in the direction of rotation tends to decrease, while the frequency of a beam travelling in the direction opposite the rotation increases, entailing a frequency difference between the two countertravelling beams. This is known as Sagnac effect. The angular velocity of the rotating gyroscope may be determined by detecting the frequency difference; and, from the angular velocity determined, it is possible to determine the rotation angle.

Normally, ring type lasers are employed to determine an angular velocity about one axis. For instance, three ring type lasers may be generated within a single laser block, e.g., a gyroscope employed in an inertial guidance system installed in an airplane, to determine the orientation of the airplane by measuring the angular velocities about three mutually perpendicular axes.

Conventionally, the ring type laser gyroscope comprises an optical ring resonator formed of a plurality of reflective surfaces and a laser beam source. Typically, a gas discharge is used as a pumping means for a gaseous active medium.

However, the laser gyroscope employing the gas discharge as the laser pumping means suffers from a number of deficiencies. One of the disadvantages is the size: that is, a gas discharged laser is normally a bulky device, thereby rendering the gyroscope also bulky. In addition, the device requires a high voltage for excitation which may be incompatible with most of today's solid state electronic equipment.

SUMMARY OF THE INVENTION

It is, therefore, a primary object of the present invention to provide a laser gyroscope employing therein a solid state active medium and a laser diode as its laser pumping source.

It is a further object of the present invention to provide a laser gyroscope employing a novel method of determining a rotation angle thereof.

In accordance with one aspect of the present invention, there is provided a solid state ring type nonplanar laser gyroscope capable of utilizing a self-modulation regime comprising: a base which is arbitrarily divided into first and second portions; a laser pumping source located on the first portion of the base, wherein the laser pumping source is a laser diode capable of emitting a laser beam; an active medium having a sensitive axis of rotation, located on the second portion of the base and facing the laser pumping source, wherein two counterpropagating waves are established inside the active medium, each of the counterpropagating waves being self-modulated, having a frequency thereof; a magnet located on top of the active medium, wherein the magnet is used to distinguish a direction of rotation; a focussing unit for focussing the laser beam from the laser pumping source into the active medium; and means, located between the laser pumping source and the active medium, for detecting the selfmodulation frequency of one of the counterpropagating waves.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
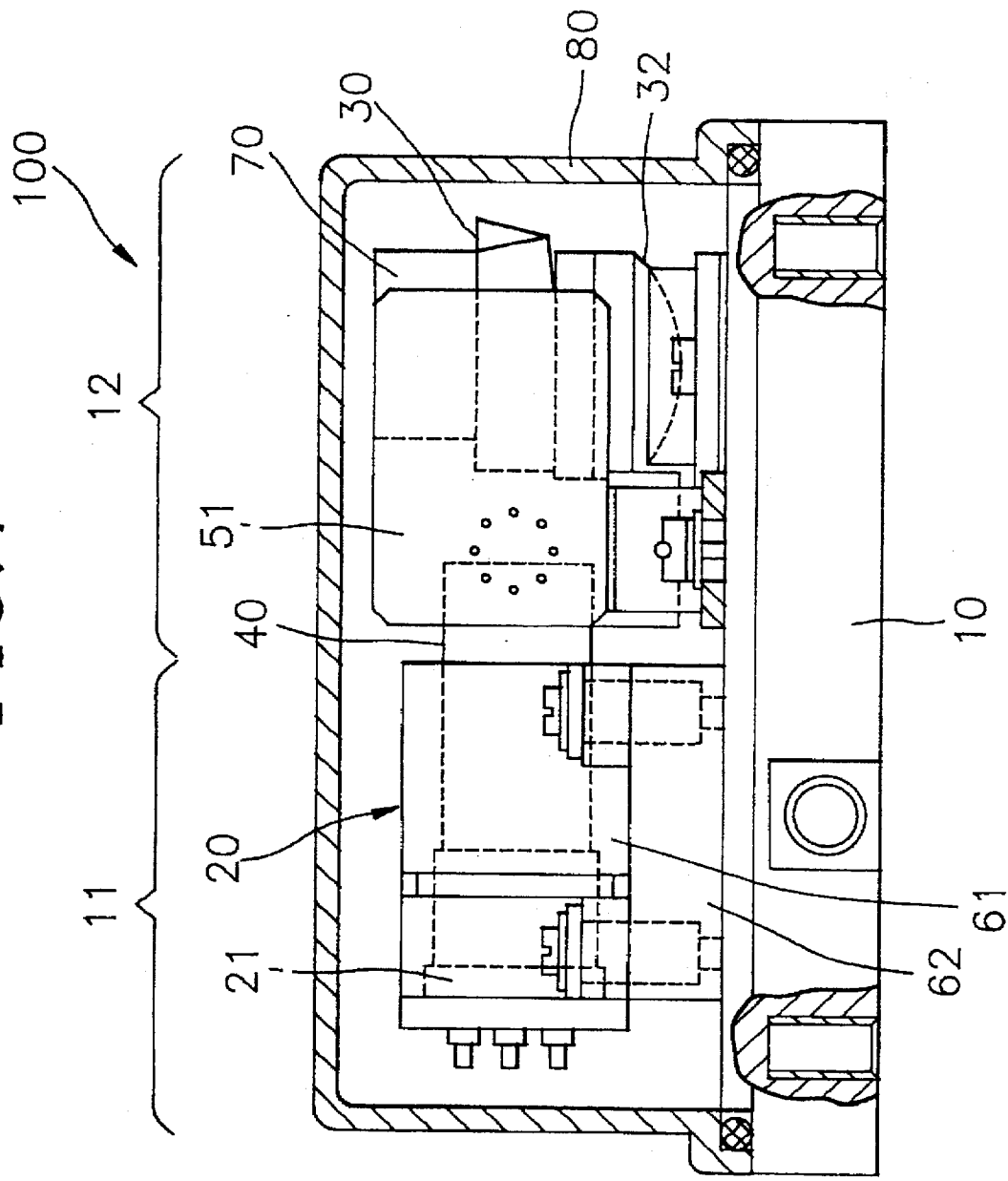
FIG. 1 shows a cross sectional view of an inventive solid state ring type laser gyroscope in accordance with a preferred embodiment of the present invention.
Figure 2:
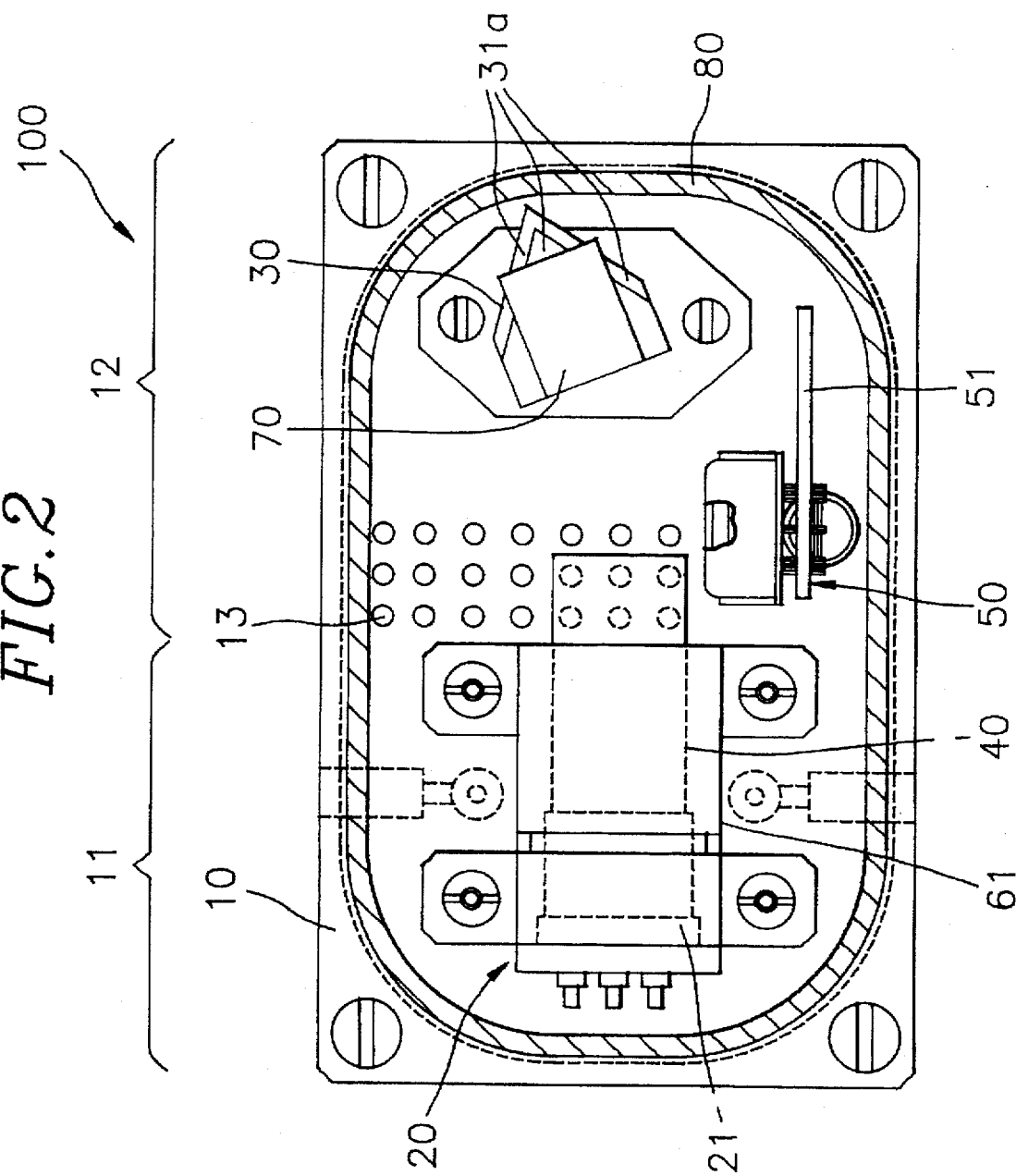
FIG. 2 offers a top view of the inventive solid state ring type laser gyroscope shown in FIG. 1.

There are shown in FIGS. 1 and 2 a top and a cross sectional views of an inventive solid state ring type laser gyroscope 100, including a base 10, a laser pumping source 20, an active medium 30 having a nonplanar geometry, a focussing unit 40, a detector 50, a magnet 70 and a cover 80.

As shown in FIGS. 1 and 2, the base 10 is arbitrarily divided into first and second portions 11, 12 and includes a plurality of pins 13 connected to an outside control circuit (not shown). Furthermore, the base 10 is designed in such a way that it is capable of providing an increased mechanical stability with a reduced weight. The laser pumping source 20 capable of emitting a laser beam and the active medium 30 having a sensitive axis of rotation are located, facing each other, on the first portion 11 and the second portion 12 of the base 10, respectively.

The laser pumping source 20 of the present invention includes a laser diode 21, e.g., a GaAlAs laser diode centered at 810 nm. The use of the laser diode as the laser pumping source allows the inventive gyroscope to be less bulky and to be operated with less power than the prior art laser gyroscope, since the laser diode is less bulky and requires less power for excitation. The focussing unit 40 for focussing the laser beam emitted by the laser pumping source 20 onto the active medium 30 includes a plurality of focussing lenses (not shown) and is located between the laser pumping source 20 and the active medium 30.

Figure 3A:
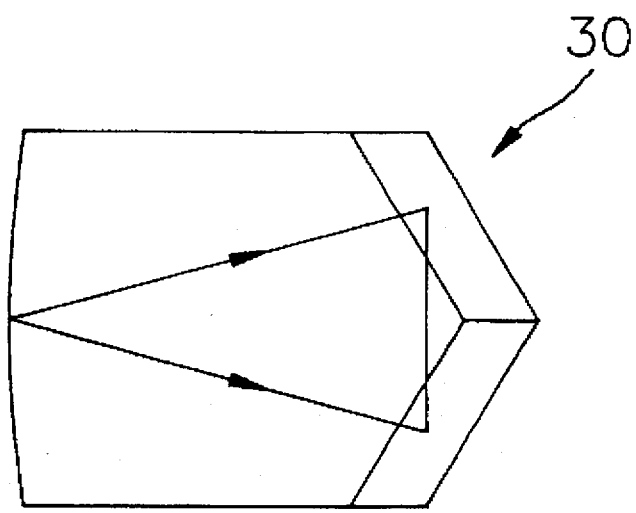
FIGS. 3(a) and 3(b) depict a top and a side views of a nonplanar resonator implemented in the ring type laser gyroscope, respectively, shown in FIG. 2, wherein the arrows indicate the beam path therein.
Figure 3B:
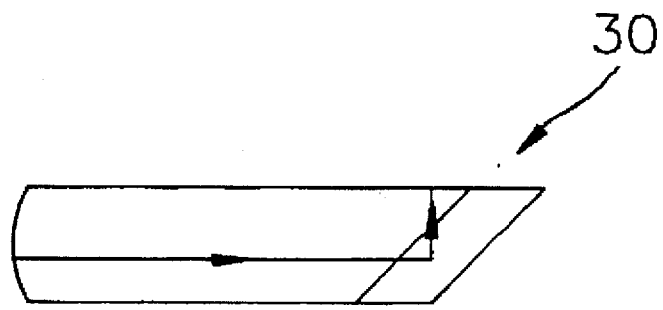

There are illustrated in FIGS. 3(a) and 3(b) a top and a side views of the nonplanar geometry of the active medium 30, wherein the arrows indicate the beam path therein. The active medium 30 is a ring type resonator having a ring path defined by four reflecting surfaces. Three of the reflecting surfaces are flat and optically polished to provide a total and internal reflection of the laser beam, and the remaining surface is spherical, convexed and covered with a multilayer dielectric coating to provide a partial transmission of the laser beam. The surface with the multilayer dielectric coating is used as an output coupler. Two of the important coating parameters to be specified are Rs and Rp representing the reflectivity for the S-polarization and P-polarization, respectively. The active medium 30 is fixed to a hinge 32 on the base 10 to provide an easy optical alignment. The magnet 70 having a magnetic field strength of less than 0.1 Tesla is located on top of the active medium 30, wherein the magnetic field strength depends on the nonplanar geometry of the active medium 30.

Figure 4:
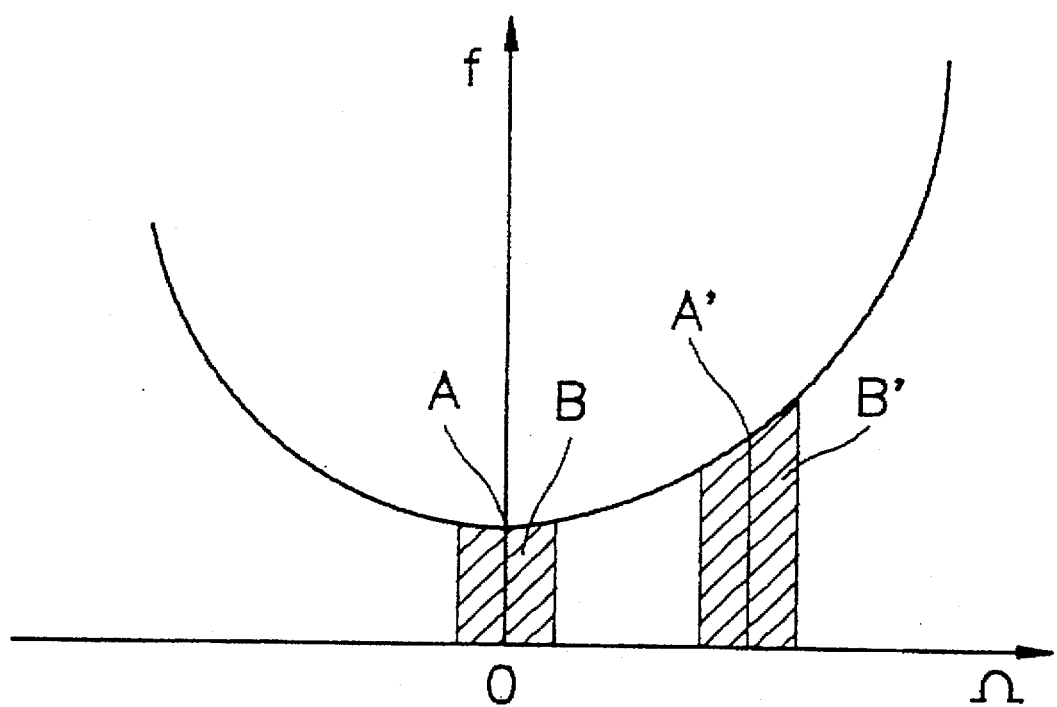
FIG. 4 illustrates the relationship between the selfmodulation frequency and the angular velocity of a wave propagating in an active medium.

In the inventive solid state ring type laser gyroscope 100, the laser beam emitted by the laser pumping source 20 is focussed into the active medium 30 by the focussing unit Inside the active medium 30, two counterpropagating waves are established, one wave propagating in one direction with respect to the axis of rotation and the other wave in an opposite direction therefrom, i.e., opposite to the direction of rotation. Inside the active medium 30, the two counterpropagating waves interact with each other, which, in turn, spatially modulates the active medium 30. Portions of each of the counterpropagating waves are scattered inside the spatially modulated active medium 30 and the scattered waves nonlinearly couple with the counterpropagating waves, thereby temporally modulating the laser output from the active medium 30. The modulation frequency of the laser output is affected by the frequencies of the counterpropagating waves. When the inventive solid state ring type laser gyroscope 100 is rotated about the axis of input rotation at an angular velocity, by the Sagnac effect, the frequencies of the counterpropagating waves change, which, in turn, gives rise to a change in the modulation frequency of the intensity of the laser output. The modulation frequency of the intensity of the laser output is known as a self-modulation frequency. The self-modulation frequency of each of the counterpropagating waves is proportional to the rotational angular velocity, and the selfmodulation frequency is determined using the detector 50, located between the laser pumping source 20 and the active medium 30, and fixed to a plate 51. By determining the selfmodulation frequency of one of the counterpropagating waves, it is possible to determine the angular velocity. In the absence of magnetic field, the relationship between the angular velocity and the self-modulation frequency can be expressed as:

$$f_{SM} = M \sqrt{\Omega_0^2 + \Omega^2}$$

wherein $f_{SM}$ is the self-modulation frequency, $\Omega$ is the angular velocity of the gyroscope, $\Omega_0$ is a self-modulation characteristic constant obtained when the gyroscope is in a stationary state, and M is a scale factor. The relationship between the angular velocity $\Omega$ and the self-modulation frequency $f_{SM}$ is parabolic as shown in FIG. 4. In the absence of magnetic field, the relationship is symmetric with respect to the abscissa, i.e., the y-axis and a zero point A of the gyroscope is the minimum point of the parabola and an associated operating region of the gyroscope, shown as region B in FIG. 4, is around the minimum point of the parabola. However, in this case, there is no distinction between the wave propagating in the direction of rotation and the wave propagating in the direction opposite to the direction of rotation. Furthermore, since the slope of the parabola is so small near the zero point A and hence the change in the selfmodulation frequency is so small with respect to the angular velocity, the measurement of the rotation becomes difficult. In order to solve the above described problems, i.e., increase the sensitivity of the measurement, in the present invention, the zero point A of the gyroscope 100, and hence the operating region B, are shifted by placing the magnet 70 under an appropriate magnetic field strength of less than 0.1 Tesla, on top of the active medium 30. The shifted zero point and the shifted operating region are represented by A' and B', respectively, in FIG. 4. In such event, the relationship between the angular velocity and the self-modulation frequency can be expressed as:

$$f_{SM} = M \sqrt{\Omega_0^2 + (\Omega_B + \Omega)^2}$$

wherein the effect of the magnetic field induced rotation is included in $\Omega_B$.

When a magnetic field greater than the appropriate field is applied, it becomes difficult to detect the angular velocity by means of the self-modulation phenomenon because of the large loss difference between the two counterpropagating waves, resulting in a unidirectional single mode oscillation.

The reflectivities of the output coupler for each eigen polarization in the resonator and the biasing external magnetic field for distinguishing the direction of rotation determine the loss difference between the counterpropagating waves. The loss difference should be minimized to ensure a stable self-modulation for gyroscopic applications. The loss difference due to mirror reflectivities Rp and Rs for each eigen polarization state can be minimized by selecting Rs/Rp close to 1, allowing the self-modulation regime to be stable in more wide range of magnetic field.

A conventional fiber optics gyroscope (FOG) requires complex signal processing scheme such as external modulation, demodulation and frequency decomposing. In contrast, the inventive solid state ring laser requires no additional complex signal processing because it produces an intensity modulated signal, whose frequency is proportional to the external rotation, which can be counted by using a frequency counter.

The cover 80 is used for encasing the laser gyroscope 100.

While the present invention has been described with respect to certain preferred embodiments only, other modifications and variations may be made without departing from the scope of the present invention as set forth in the following claims.

What is claimed is:

1. A solid state ring type nonplanar laser gyroscope capable of utilizing a self-modulation regime to determine an angle of rotation, the gyroscope comprising:

a base which is arbitrarily divided into first and second portions;

a laser pumping source located on the first portion of the base, wherein the laser pumping source is a laser diode capable of emitting a laser beam;

an active medium having a sensitive axis of rotation, located on the second portion of the base and facing the laser pumping source, wherein two counterpropagating waves are established inside the active medium, each of the counterpropagating waves being self-modulated, having a frequency thereof;

a magnet located on top of the active medium, wherein the magnet is used to distinguish a direction of rotation;

a focussing unit for focussing the laser beam from the laser pumping source into the active medium; and means, located between the laser pumping source and the active medium, for detecting the self-modulation frequency of one or both of the counterpropagating waves.

2. The solid state ring type nonplanar laser gyroscope of claim 1, wherein the magnet has a field strength which is sufficient enough to distinguish the direction of rotation and to increase a sensitivity in measurement thereof but not enough to break down a regime of self-modulation.

3. The solid state ring type nonplanar laser gyroscope of claim 1, wherein the active medium is provided with a plurality of reflecting surfaces, one of the reflecting surfaces being convexed, spherical and covered with a multilayer dielectric coating defined by two coating parameters, Rs and Rp, representing, respectively, a S-polarization reflectivity and a P-polarization reflectivity, said reflecting surface being used as an output coupler, the coating parameter thereof being optimized to minimize a loss difference between the counterpropagating waves.

4. The solid state ring type nonplanar laser gyroscope of claim 1, wherein the relationship between the self-modulation frequency $f_{SM}$ and the angular velocity thereof $\Omega$ is expressed as:

$$f_{SM} = M\sqrt{\Omega_0^2 + (\Omega_B + \Omega)^2}$$

wherein M is a scale factor, $\Omega_0$ is a self-modulation characteristic constant obtained when the gyroscope is in a stationary state and the effect of the magnetic field induced rotation is included in $\Omega_B$.

5. The solid state ring type nonlinear laser gyroscope of claim 1, wherein the self-modulated frequency is directly measured by using a frequency counter.

* * * * *